(12) United States Patent
Whitehouse (10) Patent No.: US 7,136,092 B2
(45) Date of Patent: Nov. 14, 2006

(54) METHOD AND APPARATUS FOR TESTING VIDEO CHROMA QUANTIZATION

(75) Inventor: Thomas Clyde Whitehouse, Bethlehem, GA (US)

(73) Assignee: General Instrument Corporation, Horsham, PA (US)

( * ) Notice: Subject to any disclaimer, the term of this patent is extended or adjusted under 35 U.S.C. 154(b) by 719 days.

(21) Appl. No.: 10/357,583

(22) Filed: Feb. 3, 2003

(65) Prior Publication Data

US 2004/0150719 A1   Aug. 5, 2004

(51) Int. Cl.
*H04N 17/02* (2006.01)
(52) U.S. Cl. .................................. 348/182; 348/186
(58) Field of Classification Search ........ 348/180–182, 348/184–186, 189; 702/66, 67; *H04N 17/00, H04N 17/02*
See application file for complete search history.

(56) References Cited

U.S. PATENT DOCUMENTS

| 4,069,500 | A  | * | 1/1978 | Hurst .......................... 348/182 |
| 6,400,400 | B1 | * | 6/2002 | Isnardi et al. ............... 348/180 |
| 6,741,277 | B1 | * | 5/2004 | Rau ............................ 348/181 |

* cited by examiner

*Primary Examiner*—Sherrie Hsia
(74) *Attorney, Agent, or Firm*—Benjamin D. Driscoll (57) ABSTRACT

A method for testing the chroma performance of a digital rendering integrated circuit includes generating a video test signal where the video test signal has a constant luma amplitude, constant chroma amplitude, and varying chroma phase. The method then continues by modulating the video test signal with the digital rendering circuit, and displaying output from the digital rendering circuit.

20 Claims, 5 Drawing Sheets

METHOD AND APPARATUS FOR TESTING VIDEO CHROMA QUANTIZATION

TECHNICAL FIELD

The present invention relates to the field of digital video signal transmission. More particularly, the present invention relates to a method for modulating a digital video signal in such a way as to test the chrominance performance of digital video rendering integrated circuits.

BACKGROUND

Video signals are a way of transferring visual information from one point to another. The transfer of video signals may be as remote as transferring a signal from a cable head end unit to a television set (TV) in a cable television system or as local as transferring video signals from one internal chip to another internal chip located within a single television set or set-top box.

Traditionally, video transfer has been performed using analog signals. Recently, digital signals have been employed to transfer video signals. The recent trend toward digital signal transmission is a result of the improved quality and falling costs of digital transmission related components.

The transition away from analog video transfer to digital video transfer has, however, been a slow process. While cable companies and other video broadcasters have begun to transmit video information using digital signals, a large number of television sets, monitors, videocassette recorders, and other viewing equipment continue to use analog signals or analog connection equipment. The continued use of analog signals and analog connection equipment requires, in many cases, a conversion from digital to analog prior to viewing of the video signal.

A large part of the conversion from a digital signal to an analog signal focuses on the color component of the video signal. Digital video information and analog video information are transmitted using different color spaces. Color spaces vary depending on the mathematical representation used to indicate colors such as, for example, the coordinate system used to mathematically represent a color. Typically, analog video systems use the red, green, blue (RGB) color space to represent color while digital video systems typically use the YCbCr color space. YCbCr is the color space originally defined by ITU-R BT.601, an international standard established by the International Telecommunication Union (ITU), now used for all digital component video formats.

The Y component of the YCbCr color space represents the luma or black and white component of the digital video signal. The Cb and Cr components of the YCbCr color space represent chroma difference signals of the digital video signal. Subtracting the luma from the red and blue components forms the color difference components.

Because different color spaces are used by analog and digital signals, a conversion from a digital video signal to an analog video signal necessarily entails color space conversion. The color space conversions are performed by integrated circuits or other internal circuitry of a digital television decoder such as a set-top box. The quality of the color space conversions may vary greatly depending on the quality of the circuitry being used.

Evaluating the quality of the color space conversion has traditionally been very subjective in nature. The subjective evaluations typically rated color space conversion circuitry based on the opinion of a viewer after visual inspection. The subjective evaluation of color space conversion circuitry often leads to systems that perform what may be less than ideal conversions from digital video to analog video.

SUMMARY

In one of many possible embodiments, the present invention provides a method for testing the chroma performance of a digital rendering circuit. The method includes generating a video test signal that has constant luma amplitude, constant chroma amplitude, and varying chroma phase; modulating the video test signal with the digital rendering circuit; and displaying output from the digital rendering circuit on a display device.

In another of many possible embodiments, the present invention provides a system for testing the chroma performance of a digital rendering circuit that includes a video test signal generator, a digital rendering circuit communicatively coupled to the video test signal generator, and a video signal viewing device communicatively coupled to the digital rendering circuit. The video test signal generator includes a machine-readable medium having instructions thereon for producing a video test signal of constant luma amplitude, constant chroma amplitude, and continuously varying chroma phase.

BRIEF DESCRIPTION OF THE DRAWINGS

The accompanying drawings illustrate various embodiments of the present invention and are a part of the specification. Together with the following description, the drawings demonstrate and explain principles of the present invention. The illustrated embodiments are examples of the present invention and do not limit the scope of the invention.

Throughout the drawings, identical reference numbers designate similar, but not necessarily identical, elements.

DETAILED DESCRIPTION

Embodiments of the invention are generally drawn to a system for evaluating the video chroma quantization characteristics of video conversion circuitry that translates digital video signals into analog video signals or vice versa. According to one exemplary implementation, described more fully below, a video test signal is used to objectively evaluate the video chroma quantization of video conversion circuitry. In the following description, for purposes of explanation, numerous specific details are set forth in order to provide a thorough understanding of the invention. It will be apparent, however, to one skilled in the art that the invention can be practiced without these specific details.

Reference in the specification to "one embodiment" or "an embodiment" means that a particular feature, structure, or characteristic described in connection with the embodiment is included in at least one embodiment of the invention. The appearance of the phrase "in one embodiment" in various places of the specification are not necessarily all referring to the same embodiment.

Exemplary Overall Structure

Figure 1:
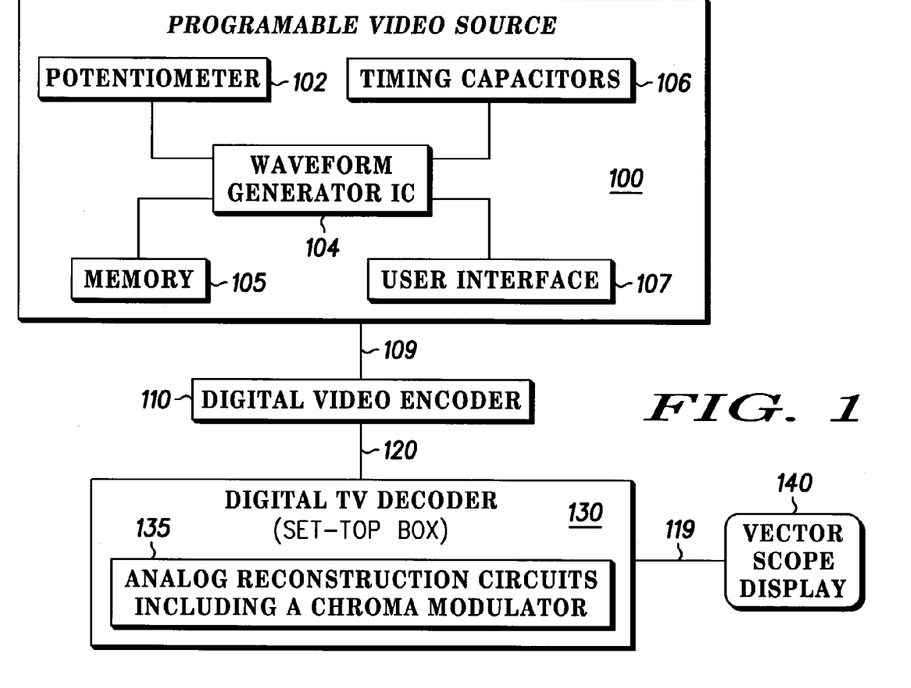
FIG. 1 is a block diagram illustrating a video test system for testing the chrominance performance of digital video rendering integrated circuits according to one embodiment of the present invention.

FIG. 1 illustrates the structure of a video test apparatus to evaluate and analyze analog reconstruction circuits in a digital transmission system according to one embodiment of the present invention. As shown in FIG. 1, the video test system includes a programmable video source (100) for producing a video test signal. The programmable video source (100) is in communication with a digital video encoder (110). The digital video encoder (110) is subsequently connected to a digital television (TV) decoder or set-top box (130) through, for example, a cable plant (120). The digital TV decoder (130) is then communicatively connected to a vectorscope display (140) for displaying the results of the signal reconstruction performed by the system.

The programmable video source (100) illustrated in FIG. 1 produces an analog video test signal to be used for testing the chrominance performance of the digital video rendering integrated circuits (135) of the digital video decoder (130). The programmable video source (100) is to be understood both here and in the appended claims as a function generator, a personal computer, or any other computing device capable of producing a controllable video test signal.

As illustrated in FIG. 1, the programmable video source (100) includes a waveform generator (104) for generating the analog video test signal. This generator (104) may include, or communicate with, a memory device (105) that contains instructions for generating the analog video test signal. The memory device (105) may include a read-only memory (ROM) chip, a floppy or optical disc, a hard drive, or any other data storage device which, when accessed, may produce instructions for forming the desired video test signal with the waveform generator (104). Alternatively, the memory (105) and generator (104) may be embodied as an application-specific integrated circuit (ASIC).

When accessed, the memory (105) of the waveform generator (104) provides the generator (104) of the programmable video source (100) with instructions for producing the desired video test signal. The embodiment illustrated in FIG. 1 uses a waveform generator integrated circuit (104) such as an 8038-waveform generator for generating the video test signal. A potentiometer (102) and timing capacitors (106) are also included in the programmable video source (100) and are connected to the waveform generator (104) integrated circuit (IC) in order to regulate the phase and amplitude of the generated test signal.

The programmable video source (100) also preferably includes a user interface (107) for allowing a user to select and control the desired video test signal. The user interface (107) preferably includes one or more user input devices, for example, keys, buttons, knobs, dials, switches, a touch-sensitive display, a trackball, a trackpad, a graphical user interface, and/or other devices for receiving user input. The user interface (107) may also include a display device, such as a liquid crystal display.

The programmable video source (100) is connected to a digital video encoder (110). The communication (109) between the programmable video source (100) and the digital video encoder (110) may be through any number of communications means including, but in no way limited to, a coaxial cable, a fiber optic cable, and/or wireless radio frequency (RF) communication means.

The digital video encoder (110) receives the generated analog video test signal from the programmable video source (100) and converts the analog video test signal into a digital representation of the analog video test signal and/or compresses the video test signal using MPEG or other compression technology. The digital video encoder may be an MPEG digital video encoder that incorporates any Moving Picture Experts Group (MPEG) digital video standard to digitize and/or compress the analog representations of the video test signal generated by the programmable video source (100).

Once the digital video encoder (110) has processed the video test signal, the digital form of the test signal is sent to a digital television decoder (130) over a cable plant (120). The cable plant (120) provides the medium for transferring the video test signal between the digital video encoder (110) and a digital television decoder (130) such as a set-top box. A cable plant (120) is to be understood both here and in the appended claims as any means of data transmission connecting an STB to a head end signal transmitting device including but in no way limited to a coaxial cable, a telephone line, satellite, etc.

When the video test signal is transmitted over the cable plant (120), the digital television decoder (130) receives and decodes the video test signal. The digital television decoder (130) illustrated in FIG. 1 may be any single unit or combination of units specifically programmed to both receive and decode a digital video signal into a form useable by analog viewing components, such as an analog television set.

The digital television decoder (130) illustrated in FIG. 1 is preferably a set-top box including analog reconstruction circuits (135) that include a baseband chroma modulator. A set-top box is any electronic device designed to output an audiovisual signal for use by a television set. Typically, the set-top box interface the television set with a cable or satellite television system. A set-top box may also be connected to some other communications channels including, but in no way limited to, a telephone line, an integrated services digital network (ISDN), optical fibre, cable and/or wireless RF communication means.

A baseband chroma modulator is a circuit that when presented with a digital representation of a video signal, is able to combine the different components of the digital signal to form a single signal representing the combined digital chroma signals. The single combined signal is then used to reconstruct an analog video signal. The baseband chroma modulator of the analog reconstruction circuits (135) has a finite resolution based on the number of bits implemented by the baseband chroma modulator. The limitations attributable to the number of bits implemented by the baseband chroma modulator are tested by the present invention to evaluate the accuracy of the video signal reconstruction.

The digital television decoder (130) is subsequently connected to a vectorscope display (140). The connections (119) used to transmit the reconstructed video test signal from the digital television decoder (130) to the vectorscope display (140) may include, but is in no way limited to RCA cables, S-video cables, a coaxial cable, etc. A vectorscope display (140) is an instrument that displays chrominance video data on a Cb/Cr or alternatively a U/V Cartesian coordinate plane with selectable chroma saturation targets. Typically, a vectorscope display (140) includes two major components: a graticule and a trace (See FIGS. 7 and 8). The graticule is typically a circle with a grid on the outer circumference used to measure the differential gain and phase of an incoming video test signal. The trace is the display created by decoding the chrominance portion of a video signal and plotting the result on the Cartesian coordinate plane.

Exemplary Implementation and Operation

Figure 3:
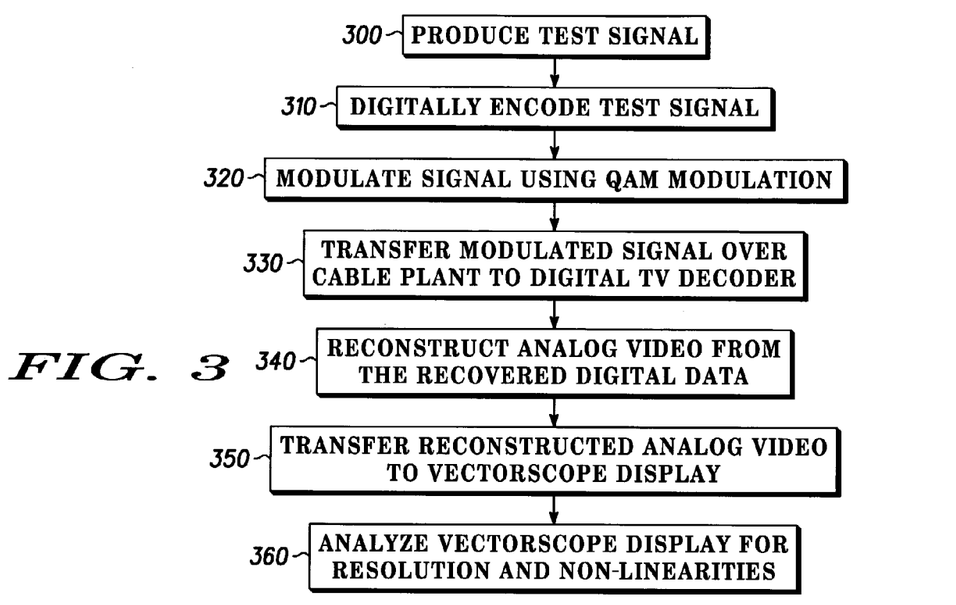
FIG. 3 is a flow chart demonstrating a video testing method according to one embodiment of the present invention.

As illustrated in FIG. 3, the testing process begins when the programmable video source is accessed and produces a video test signal (step 300). A user accesses a graphical user interface as described above, which allow the user to interact with the programmable video source (100, FIG. 1) by entering and adjusting the parameters of the desired video test signal. The parameters that may be determined through the user interface may include, but are in no way limited to, the luma amplitude, the amplitude of the chroma signal, and/or the duration of the video test signal. While the user may initially determine the luma amplitude, the video test signal produced utilizes a constant luma throughout the duration of the video test signal.

Luma is a video representation of the monochrome component of a scene such as a black and white television picture. The constant luma amplitude video test signal is superimposed with a chroma signal of constant amplitude for the duration of the video test signal. While the amplitude is constant for the duration of each video test signal, the constant amplitude value can be selected and adjusted prior to production of each video test signal through the user interface mentioned above. The amplitude of an analog chroma signal determines the color saturation level of the signal.

Color saturation level is to be understood as the amount of color or lack of pigment present in a represented color. While the saturation level and the luma are constant for the duration of each video test signal, the phase of the superimposed chroma signal is varied continuously. By varying the phase of the superimposed chroma signal, the hue or wavelength of the colors being represented by the video test signal are varied. Continuously varying the chroma phase of the video test signal allows us to circumnavigate and thereby test the full vector chroma space of a baseband chroma modulator (135, FIG. 1).

When directed by a user, the waveform generator (104, FIG. 1) produces a desired video test signal. The phase and the amplitude of the video test signal may be controlled and adjusted by the timing capacitors (106, FIG. 1) and the potentiometer (102, FIG. 1). The amplitude is determined prior to the production of the video test signal and the chroma phase of the video test signal is continuously varied throughout the duration of the video test signal.

Figure 4:
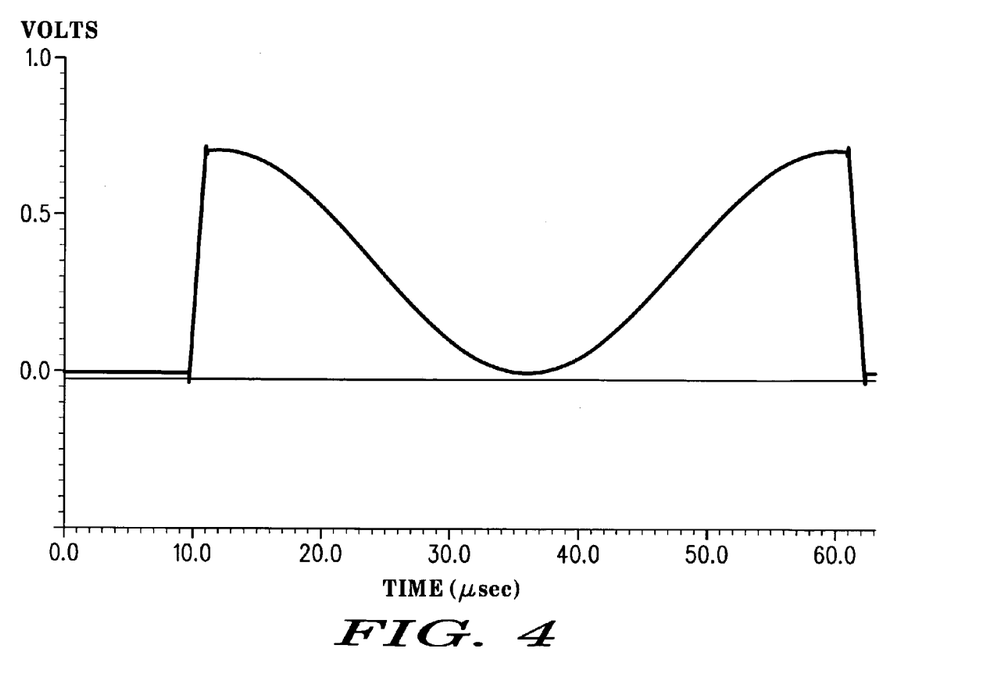
FIG. 4 illustrates a video test signal for evaluating the red component of a color space conversion according to one embodiment of the present invention.
Figure 5:
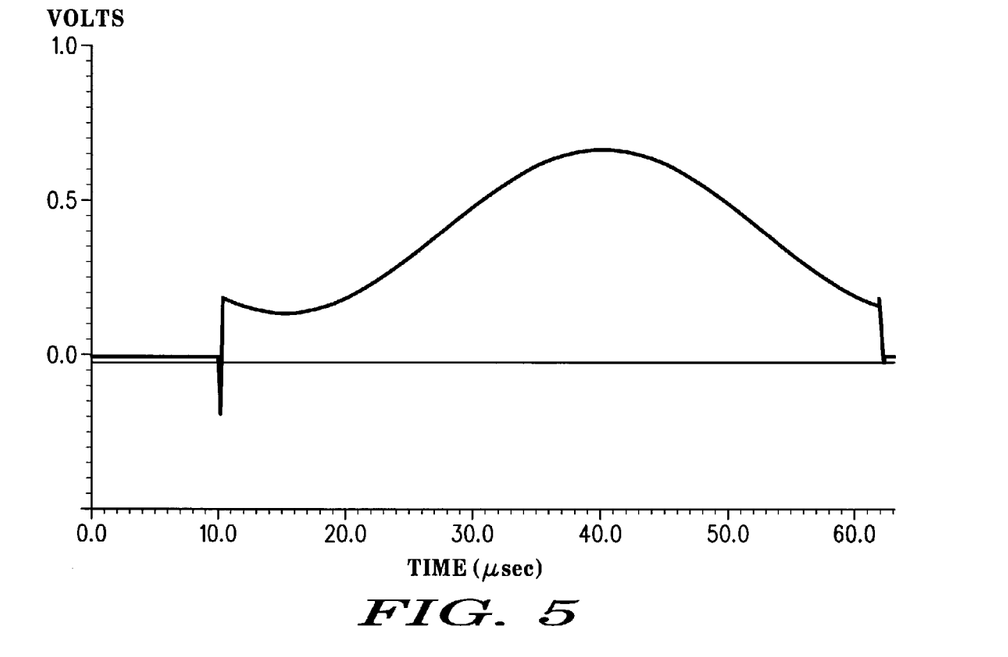
FIG. 5 illustrates a video test signal for evaluating the green component of a color space conversion according to one embodiment of the present invention.
Figure 6:
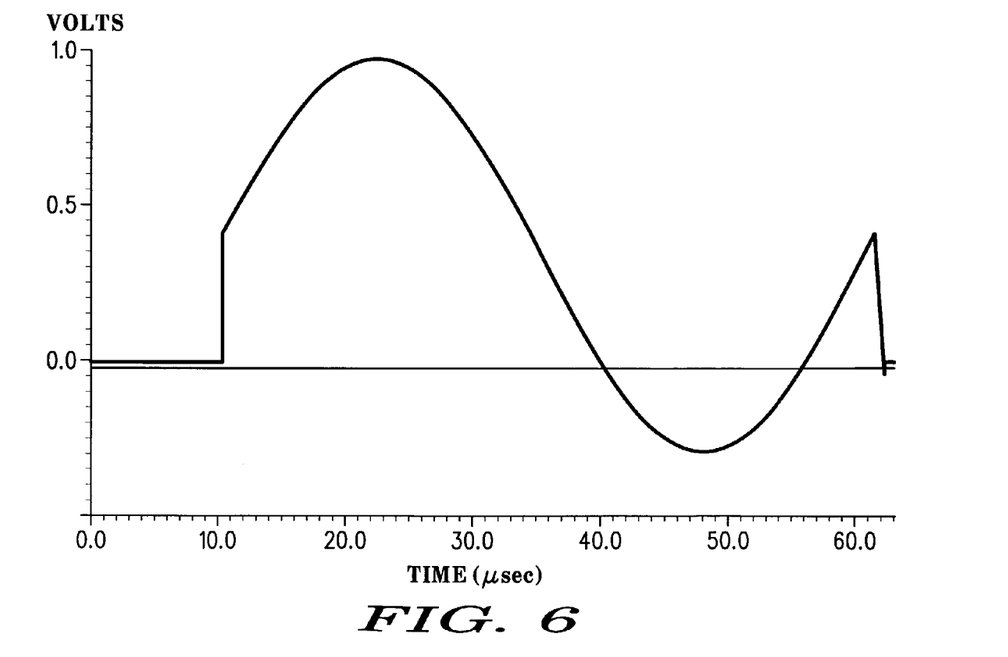
FIG. 6 illustrates a video test signal for evaluating the blue component of a color space conversion according to one embodiment of the present invention.

FIGS. 4–6 illustrate graphical representations of sample video test signals that may be produced using the programmable video source (100, FIG. 1). FIG. 4 illustrates a graphical representation of a video test signal produced by the programmable video source that may test the chroma quantization of video circuitry as the circuitry reconstructs video images containing red chroma. FIG. 5 illustrates a graphical representation of a video test signal produced by the programmable video source that may test the reconstruction of video containing green chroma. In a similar manner, FIG. 6 illustrates a graphical representation of a video test signal produced by the programmable video source to test the reconstruction of video signals containing blue chroma.

FIGS. 4–6 illustrate the video test signal produced by the programmable video source (100; FIG. 1) at distinct phases. According to one embodiment, the phase of the video test signal is continuously varied so as to circumnavigate the entire vector chroma space at fixed amplitude. This unique feature allows for complete and accurate evaluation of the chroma modulation capabilities of a baseband chroma modulator (135, FIG. 1) throughout the entire vector chroma space.

Returning again to FIG. 3, once the video test signal has been generated by the programmable video source using the signals such as those represented in FIGS. 4–6 and combinations thereof, the video test signal is presented to a digital video encoder to be digitally encoded (step 310). The digital video encoder (110, FIG. 1) digitally encodes the analog video test signal produced by the programmable video source (100, FIG. 1) using MPEG or other encoding technology in a manner similar to typical digital television broadcasts.

The digitally encoded representation of the video test signal may be represented in the YCbCr color space as defined by BT.601. Additionally, it is possible to digitally encode the video test signal using YUV space, or any other color space capable of being used to digitally encode a video test signal. It is also possible to use joint photographic experts group (JPEG) technology to convert the video test signal to a digital representation.

Once the video test signal has been digitally encoded, the digital video encoder (110, FIG. 1) modulates the video test signal (step 320) using, for example, quadrature amplitude modulation (QAM). QAM is a combination of amplitude modulation and phase shift keying used to represent a binary digital value in a form that can be transmitted over a cable plant. By varying the shape and phase shifting 2 carrier waves (I-in phase and Q-quadrature phase), for example, QAM allows N bits of data representing the digitally encoded video test signal to be transmitted over the cable plant per cycle. The number N can be any number but is typically N=6 (64 QAM) or N=8 (256 QAM) for the transmission of digital video. The I channel gets N/2 bits of data and the Q channel gets N/2 bits of data.

When the digital data stream is created from the digitally encoded video signal, the signal is placed in 188- or 204-byte packets by the digital video encoder. These data streams contain program ID numbers (PIDs), header information, data, checksums, and, in the case of 204-byte packets, forward error correction data (FEC). The QAM modulator modulates this stream.

A processor in the digital video encoder accesses a data storage device containing instructions for converting digital values into QAM signals. As the processor receives the digital data stream, the processor breaks up the data stream and converts the data streams into a QAM modulated signal according to the conversion instructions stored in the data storage device and transmitted over the cable plant. It is possible to perform the quadrature amplitude modulation using any number of bits and therefore transferring any number of bits per second up to Shannon's limit.

Once the video test signal has been successfully encoded and modulated, by the digital video encoder (110, FIG. 1), the video test signal is transferred over the cable plant (120, FIG. 1) to the digital TV decoder (step 330).

When the digital television decoder receives the digital video test signal that has been transported over the cable plant (step 330), the digital television decoder (130; FIG. 1) receives the signal and reconstructs the digital data from the QAM modulated signal using a signal demodulator (not shown). The signal demodulator is preferably an integral part of the digital television decoder, however, it is within the scope of the present video test system for the signal demodulator to be an independent component external to the digital television decoder. Once the digital data is reconstructed from the QAM modulated signal, the digital television decoder reconstructs the analog video from the extracted digital data (step 340). The reconstruction of the analog video signal is performed as the digital television decoder (130, FIG. 1) introduces the digital video test signal into the analog reconstruction circuits to be reconstructed into analog form. The reconstruction process requires that a digital baseband chroma modulator be employed in the set-top box. Because a digital baseband chroma modulator is digital in nature it has finite resolution which is based on the number of bits implemented.

Once received in the baseband chroma modulator, the digital representations of the waveforms generated by the programmable video source (100, FIG. 1) are transformed from their YCbCr digital color space to an analog composite color space. The baseband chroma modulator includes an input connected to receive the digitized video signals and an output for outputting the resulting analog signal. The baseband chroma modulator selectively converts the digitized video signals to analog signals according to a predetermined transfer function.

The transfer function provides the information needed for the conversion circuitry to perform the transformation from YCbCr digital color space to an analog composite color space. The conversion from YCbCr digital color space to an analog composite color space is the same conversion that would be performed by a baseband chroma modulator when receiving a digital signal to be transformed and transmitted to an analog viewing device such as an analog television set or videocassette recorder. Once the conversion has occurred and the modulated chroma has been summed with the reconstructed luminance, the resulting analog composite representation of the waveform is transmitted for display and evaluation.

Once the video test signal has been reconstructed into analog form, it would typically be transmitted to an analog television or other device. However, according to one embodiment, the reconstructed video test signal is transmitted from the digital television decoder to a vectorscope display (step 350). The reconstructed analog video signal is sent from the set-top box to a vectorscope display (140, FIG. 1) in order to analyze the quality of the video reconstruction circuitry (step 360). The magnitude of the chroma portion of the display (video test signal) is reduced and the gain of the vectorscope increased until the quantized steps of the baseband chroma modulator can be seen. The resolution and non-linearities of the digital baseband chroma modulator can then be readily observed.

Figure 7:
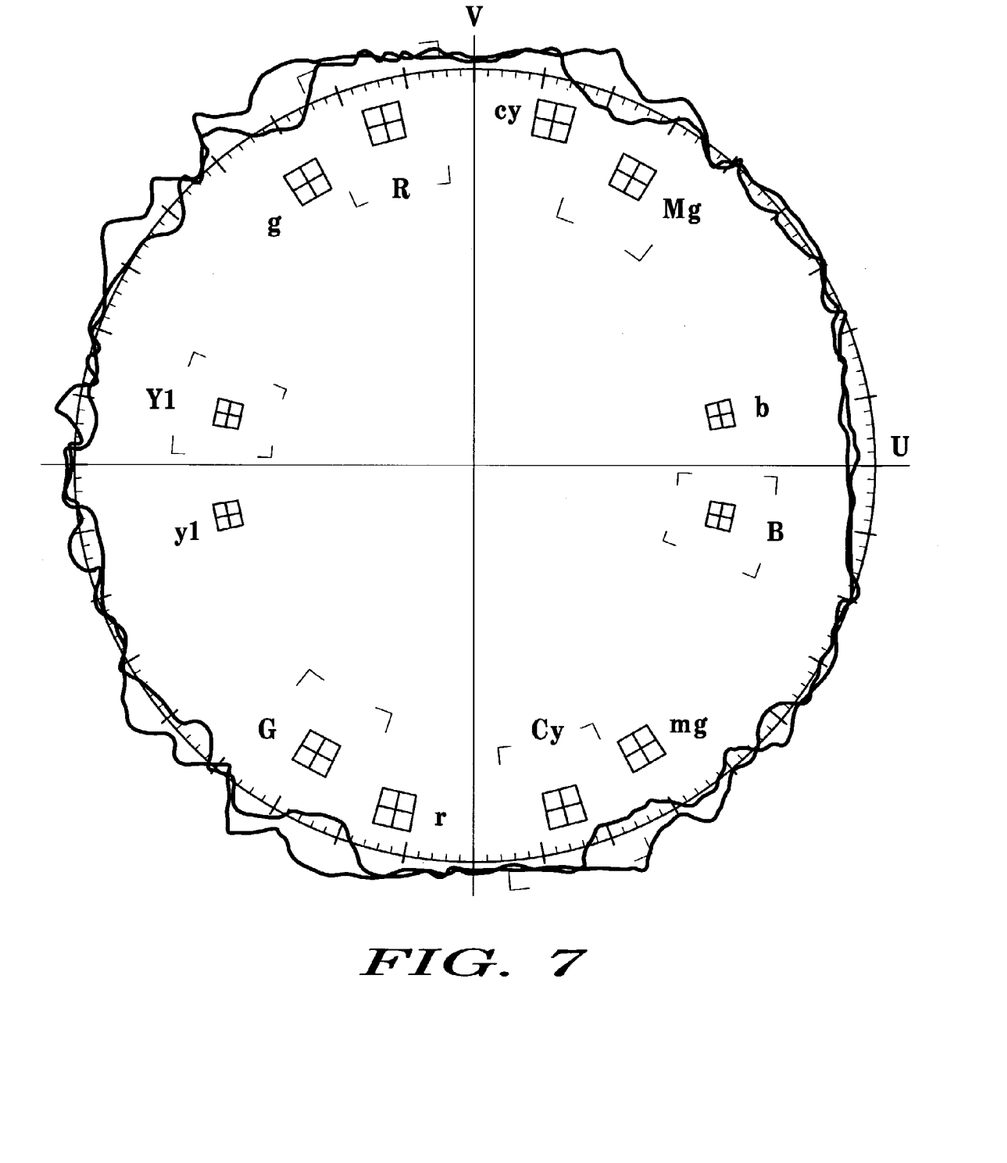
FIG. 7 is a vectorscope display illustrating proper chroma quantization by conversion circuitry when presented with a phase varying video test signal according to one embodiment of the present invention.

FIG. 7 is a vectorscope display illustrating proper chroma quantization by conversion circuitry when presented with a phase varying video test signal produced by the system described above. As is shown in FIG. 7, the trace closely follows the graticule of the vectorscope without large deviations.

Figure 8:
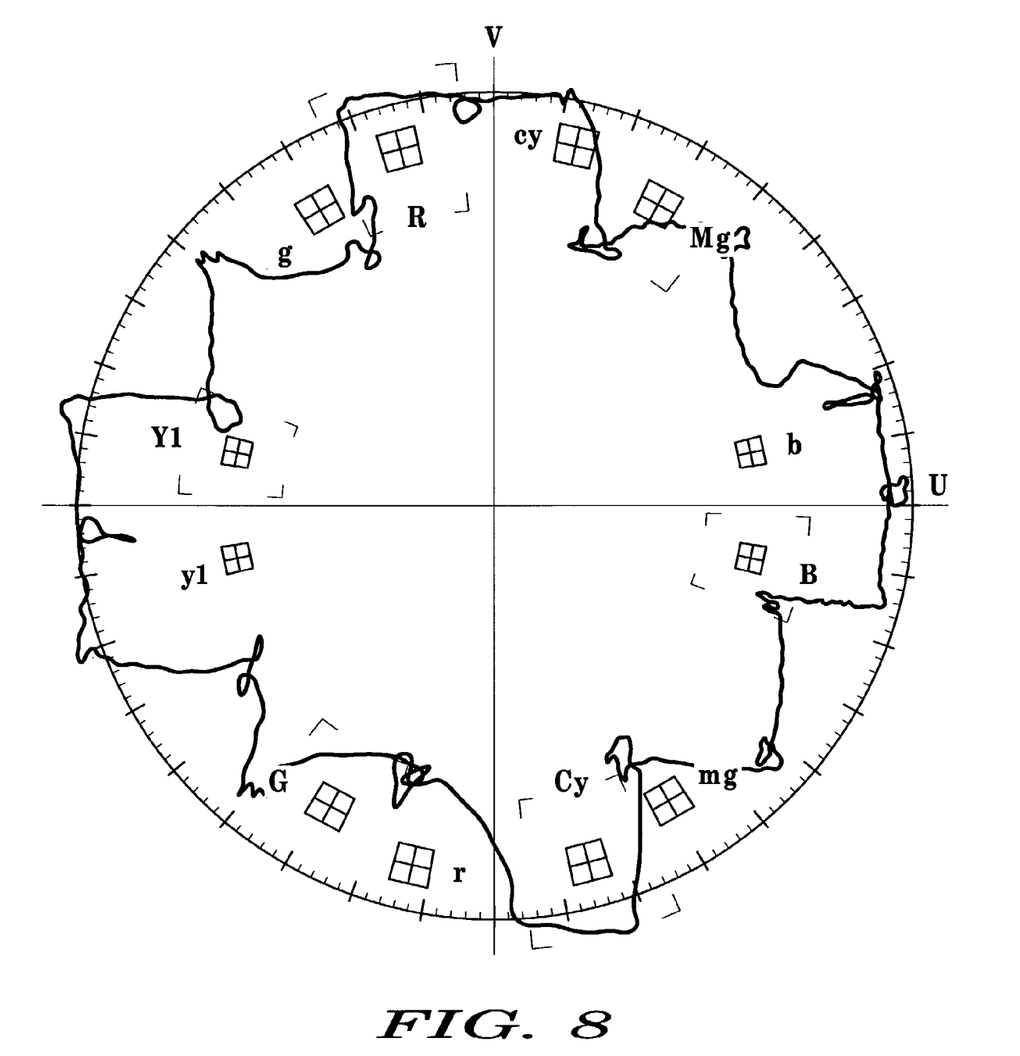
FIG. 8 is a vectorscope display illustrating poor chroma quantization by conversion circuitry when presented with a phase varying video test signal according to one embodiment of the present invention.

As distinguished from FIG. 7, FIG. 8 illustrates a vector scope display of improper chroma quantization by conversion circuitry when presented with a phase varying video test signal. As illustrated in FIG. 8, the trace does not closely follow the graticule of the vectorscope display. The deviations from the graticule demonstrate areas of the vector chroma space that are not accurately reconstructed by the baseband chroma modulator being tested.

Alternative Embodiment

Figure 2:
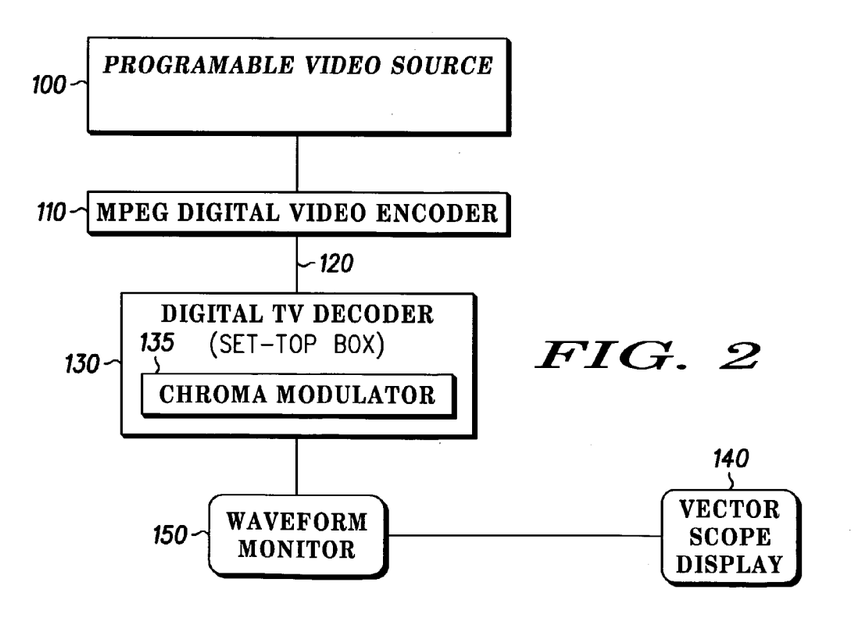
FIG. 2 is a block diagram illustrating an alternative video test system for testing the chrominance performance of digital video rendering integrated circuits according to one embodiment of the present invention.

FIG. 2 illustrates an alternative embodiment of the present invention. According to FIG. 2, a waveform monitor (150) is added to output of the digital television decoder (130). The waveform monitor (150) may be included in the system in order to allow the user to perform amplitude and timing measurements corresponding to the reconstructed video test signal. It will be understood by one of skill in the art that any additional monitoring devices may be included in the system without varying from the teachings of the present invention. Moreover, the present invention may be employed to test the digital-to-analog or analog-to-digital conversion of any color space, including but in no way limited to conversions performed by video modulators and demodulators.

In conclusion, the present invention, in its various embodiments, allows a video test apparatus to analyze the quanitzation effects of transforming a digital color space to an analog composite color space or vice versa. Specifically, the present invention allows a programmable video source to circumnavigate the full vector chroma space. The circumnavigation of the full vector chroma space allows a user to evaluate the video chroma quantization of conversion circuitry.

The preceding description has been presented only to illustrate and describe the invention. It is not intended to be exhaustive or to limit the invention to any precise form disclosed. Many modifications and variations are possible in light of the above teaching. It is intended that the scope of the invention be defined by the following claims.

What is claimed is:

1. A system for testing chroma performance of a digital rendering circuit comprising:
    a video test signal generator that generates a video test signal;
    an encoder coupled to the video test signal generator to digitally encode the video test signal and modulate the video test signal using quadrature amplitude modulation so as to generate an encoded, modulated video test signal;
    a digital rendering circuit coupled to the encoder; and
    a video signal viewing device coupled to said digital rendering circuit; wherein said video test signal generator produces a video test signal of constant luma amplitude, constant chroma amplitude, and continuously varying chroma phase.

2. The system of claim 1, wherein said test signal generator comprises a machine-readable medium containing machine-readable instructions for producing said video test signal with constant luma and chroma amplitude and continuously varying chroma phase.

3. The system of claim 1, wherein said test signal generator comprises an application specific integrated circuit (ASIC).

4. The system of claim 1, wherein said video test signal generator comprises a waveform generator integrated circuit.

5. The system of claim 1, wherein said encoder also compresses said video test signal.

6. The system of claim 5, wherein said digital rendering circuit comprises a video signal modulator.

7. The system of claim 6, wherein said video signal modulator is incorporated in a digital television decoder.

8. The system of claim 7, wherein said digital television decoder is incorporated in a set-top box.

9. The system of claim 1, wherein said digital rendering circuit is incorporated in a video signal demodulator.

10. The system of claim 1, wherein said video signal viewing device comprises a vectorscope.

11. A method for testing the chroma performance of a digital rendering circuit comprising:
 generating a video test signal wherein said video test signal includes constant luma amplitude, constant chroma amplitude, and varying chroma phase;
 digitizing said video test signal to produce a digitized video test signal;
 modulating said digitized video test signal using quadrature amplitude modulation so as to produce a modulated, digitized video test signal:
 reconstructing said video test signal from said modulated, digitized video test signal with said digital rendering circuit; and
 displaying output from said digital rendering circuit on a display device.

12. The method of claim 11, wherein said chroma phase of said video test signal is continuously varied through an entire vector chroma space.

13. The method of claim 12, wherein said digital rendering circuit comprises a baseband chroma modulator.

14. The method of claim 13, wherein said digital rendering circuit is incorporated in a digital television decoder.

15. The method of claim 14, wherein said digital television decoder is incorporated in a set-top box.

16. The method of claim 11, further comprising transmitting said modulated, digitized video test signal to said digital rendering circuit over a cable plant.

17. The method of claim 11, wherein reconstructing said video test signal with said digital rendering circuit further comprises:
 receiving said modulated, digitized video test signal in a digital television decoder;
 demodulating the modulated, digitized video test signal so as to produce the digitized video test signal:
 introducing said digitized video test signal to a baseband chroma modulator; and
 modulating said digitized video signal with said baseband chroma modulator.

18. The method of claim 17, wherein said modulating of said digitized video signal produces a reconstructed analog video signal.

19. The method of claim 18, wherein said displaying output from said digital rendering circuit on a display device further comprises transmitting said reconstructed analog video signal to a vectorscope display.

20. The method of claim 18, wherein said displaying output from said digital rendering circuit on a display device further comprises transmitting said reconstructed analog video signal to a waveform monitor.

* * * * *